UNITED STATES PATENT OFFICE 2,501,168

PROCESS OF PREPARING SUBSTITUTED PTERIDINES

John Geraci, New York, N. Y., assignor to American Cyanamid Company, New York, N. Y., a corporation of Maine No Drawing. Application June 28, 1947, Serial No. 757,923

9 Claims. (Cl. 260—251)

The present invention relates to a new method of preparing substituted pteridines. More particularly, it relates to the preparation of substituted 6-methyl amino pteridines.

The process of the present invention comprises reacting 2,4,5-triamino-6-hydroxypyrimidine, an alpha-halo-beta-alkoxy propionaldehyde, or an acetal thereof, and a primary aromatic amine. The general reaction may be illustrated by the following equation:

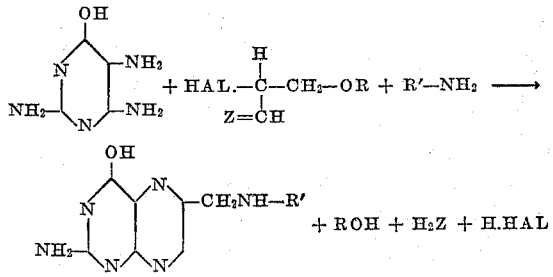

In the above equation R is an alkyl radical, Z is oxygen or 2 alkoxy radicals and R' is an aromatic radical.

The first reactant 2,4,5-triamino-6-hydroxypyrimidine is a known compound and may be prepared by methods which have been described in the chemical literature. As is also well known, this compound may exist in one or more tautomeric forms such as 2,4,5-triamino-6-oxopyrimidine or 2-imino-4,5-diamino-6-oxypyrimidine. As will be understood by those in the art, any of the tautomeric forms may be used in the same chemical reactions in like manner and reference hereinafter to the use of one tautomeric form includes the use of the others.

In carrying out my process the preferred coupling components are alpha-bromo-beta-ethoxypropionaldehyde and alpha chloro-beta ethoxy propionaldehyde. However, other beta-alkoxy propionaldehydes can be used such as the beta-methoxy, beta-propoxy, beta-butoxy and the like. Similarly, the propionaldehyde is the preferred intermediate although I can use the acetals thereof, such as alpha-bromo-beta-ethoxy propionaldehyde diethyl acetal, dimethyl acetal, dibutyl acetal, etc.

The primary aromatic amines used as intermediates in my process may be of a wide variety, including aniline and ortho-, meta-, and para-substituted aniline. The most important group of intermediates which may be used in the process of the present invention are the amides of aminobenzoic acid, including ortho-, meta-, and para-aminobenzamide and other aliphatic and aromatic amides which may be formed by the reaction of an aminobenzoyl halide with an aliphatic or aromatic amine such as ethylamine, ethanolamine, ethylhexylamine, morpholine and the like.

Of the various amides of aminobenzoic acid that may be employed as intermediates, the most important appear to be those of amino acids, particularly of glutamic acid, as, for example, p-aminobenzoylglutamic acid and polypeptides thereof such as p-aminobenzoylglutamylglutamic acid, p-aminobenzoylglutamylglutamylglutamic acid, and others having a plurality of peptid linkages made up of one or more of the various amino acids, such as p-aminobenzoylglutamylglycylglutamic acid. Compounds prepared with these intermediates have a wide range of biological activity, particularly as growth factors for certain organisms and in stimulating the formation of haemoglobin in animals, and are the preferred products of the present invention. Of course, amides of p-aminobenzoic acid and other amino acids, such as glycine, aspartic acid, leucine, alanine, isovaline cysteine, and the like, are also important intermediates of the present invention. The amino acids may be natural or synthetic and may be in any of the d, l, or dl forms. These amino acid amides possess free carboxyl groups, and, as will be apparent, the salts and esters thereof may likewise be employed.

The preferred compound of the present invention when named according to the ring system is N-[4-{[(2-amino-4-hydroxy-6-pyrimido [4,5-b] pyrazyl) methyl]-amino}benzoyl]glutamic acid. However, because of the unwieldy nomenclature this compound will be referred to hereinafter by its simplified name, pteroylglutamic acid. Compounds having a fused pyrimidopyrazyl ring structure are known as pteridines.

The reaction of the present invention can be carried out at from about 20° to about 80° C. although I prefer a temperature of from 30° to about 60° C.

It is preferable to carry out the reaction with water as a solvent, although I can use an excess of the alpha-halo-beta-alkoxy propionaldehyde ethanol, methanol, propanol, acetic acid, dioxane, etc., or mixtures thereof.

The reaction is usually complete in a matter of half an hour although it may extend over a period of 15 minuts to 3 or 4 hours.

The invention is illustrated in greater particularity in the following examples, in which the preferred product, pteroylglutamic acid, is prepared. It will be understood, of course, that these examples are merely illustrative of the process and not to be construed as limiting the invention to the specific conditions or reactants shown.

Example I

To 250 cc. of water is added 0.18 mol of 2, 4, 5-triamino-6-hydroxy pyrimidine and 0.18 mol of para amino benzoyl glutamic acid. The pH of the mixture is adjusted to 3-4 and the temperature is then adjusted to 40° to 45° C. A solution of 0.18 mol of alpha bromo beta ethoxy propionaldehyde in 50 cc. of glacial acetic acid is added to the mixture followed by the dropwise addition of 1 part iodine in 100 cc. of potassium iodide solution. During the addition of both solutions the pH was maintained at 3-4 with 20% sodium hydroxide solution. After the addition is complete the reaction mixture is heated at 40° to 45° C. for one-half hour and then cooled to 20° C. To the mixture is added 10 g. of diatomaceous earth and the mixture filtered, washed with 200 cc. of water, 50 cc. of ethyl alcohol and finally with acetone. The product on biological assay showed an activity identical with pteroylglutamic acid, which was prepared by a different method.

The product obtained in the above example may be used for many important purposes such as adjuncts to animal feeds. It a product of higher purity is desired, a suitable method for obtaining the purer product appears in the copending application of Brian L. Hutchins, Serial No. 669,099, filed May 11, 1946, now Patent No. 2,457,375.

Example II

To 700 ml. of water is added 0.12 mol of 2,4,5-triamino-6-hydroxy pyrimidine and 0.50 mol of para-aminobenzoyl glutamic acid. The pH of the mixture is adjusted to 3-4 and the temperature is then adjusted to 45°-48° C. A solution of 0.1 mol of alpha-chloro-beta-ethoxy propionaldehyde in 50 ml. of glacial acetic acid is added to the mixture followed by the drop-wise addition of 5 g. of sodium bichromate in 30 ml. of water. During the addition of both solutions the pH was maintained at 3-4 with 25% sodium hydroxide solution. After the addition is complete, the reaction is heated at 45°-50° C. for one-half hour and then cooled to 20° C. To the mixture is added 10 g. of diatomaceous earth and the mixture filtered, washed with 200 ml. of water, 50 ml. of ethyl alcohol and finally with acetone. The product on biological assay had activity identical with pteroylglutamic acid, prepared by a different method.

Example III

To 700 ml. of water is added 0.12 mol of 2,4,5-triamino-6-hydroxy pyrimidine and 0.5 mol of para-amino benzoyl alpha glutamyl glutamic acid. The pH of the mixture is adjusted to 3-4, and the temperature is then adjusted to 45°-48° C. A solution of 0.1 mol of alpha-bromo-beta-ethoxy propionaldehyde in 50 ml. of glacial acetic acid is added to the mixture followed by the dropwise addition of 5 g. of sodium bichromate in 30 ml. of water. During the addition of both solutions, the pH was maintained at 3-4 with 25% sodium hydroxide solution. After the addition is complete, the reaction mixture is heated at 45°-50° C. for one-half hour and then cooled to 20° C. To the mixture is added 10 g. diamataceous earth and the mixture filtered, washed with 200 ml. of water, 50 ml. of ethyl alcohol and finally with acetone. The product on biological assay showed an activity identical with pteroyl alpha glutamyl glutamic acid, which had previously been prepared by a different method.

Example IV

To 700 ml. of water is added 0.12 mol of 2,4,5-triamino-6-hydroxy pyrimidine and 0.50 mol of para-amino benzoyl gamma-glutamyl glutamic acid. The pH of the mixture is adjusted to 3-4, and the temperature is then adjusted to 45°-48° C. A solution of 0.1 ml. of alpha-bromo-beta ethoxy propionaldehyde in 50 ml. of glacial acetic acid is added to the mixture followed by the dropwise addition of 5 g. of sodium bichromate in 30 ml. of water. During the addition of both solutions, the pH was maintained at 3-4 with 25% NaOH solution. After the addition is complete, the reaction mixture is heated at 45°-50° C. for one-half hour and then cooled at 20° C. To the mixture is added 10 g. diatomaceous earth and the mixture filtered, washed with 200 ml. of water, 50 ml. of ethyl alcohol and finally with acetone. The product on biological assay showed an activity identical with pteroyl gamma glutamyl glutamic acid, prepared by a different method.

I claim:

1. A method which comprises reacting together in a solvent 2,4,5-triamino-6-hydroxy pyrimidine, an alpha-halo-beta-alkoxy propionaldehyde and paraamino-benzoyl glutamic acid at a temperature within the range of 20° C. to 80° C. whereby pteroylglutamic acid is produced and recovered.

2. A method which comprises reacting together in a solvent 2,4,5-triamino-6-hydroxy pyrimidine, an alpha-bromo-beta-alkoxy propionaldehyde and paraaminobenzoyl glutamic acid at a temperature within the range of 20° C. to 80° C. whereby pteroylglutamic acid is produced and recovered.

3. A method which comprises reacting together in a solvent 2,4,5-triamino-6-hydroxy pyrimidine, alpha-chloro-beta-ethoxy propionaldehyde and paraaminobenzoyl glutamic acid at a temperature within the range of 20° C. to 80° C. whereby pteroylglutamic acid is produced and recovered.

4. A method which comprises reacting together in a solvent 2,4,5-triamino-6-hydroxy pyrimidine, alpha-bromo-beta-ethoxy propionaldehyde and paraaminobenzoyl glutamic acid at a temperature within the range of 20° C. to 80° C. whereby pteroylglutamic acid is produced and recovered.

5. A method which comprises reacting together in a solvent 2,4,5-triamino-6-hydroxy pyrimidine, alpha-chloro-beta-ethoxy propionaldehyde and paraaminobenzoyl glutamyl-glutamyl-glutamic acid at a temperature within the range of 20° C. to 80° C. whereby pteroyl glutamyl glutamylglutamic acid is produced and recovered.

6. A method which comprises reacting together in a solvent 2,4,5-triamino-6-hydroxy pyrimidine, a alpha-chloro-beta-ethoxy propionaldehyde and an amino acid amide of para-aminobenzoic acid at a temperature within the range of 20° C. to 80° C. whereby compounds having the general formula

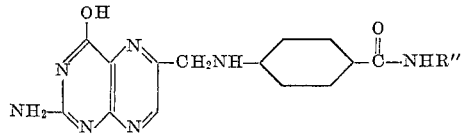

in which NHR'' is an amino acid radical, are produced and recovered.

7. A method which comprises reacting together in a solvent 2,4,5-triamino-6-hydroxy pyrimidine, an alpha-bromo-beta-ethoxy propionaldehyde, and an amino acid amide of para-aminobenzoic acid at a temperature within the range of 20° C. to 80° C. whereby compounds having the general formula

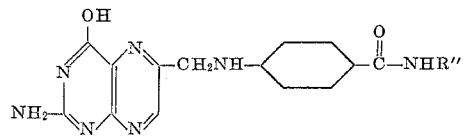

in which NHR'' is an amino acid radical, are produced and recovered.

8. A method which comprises reacting together in a solvent 2,4,5-triamino-6-hydroxy pyrimidine, an alpha-halo-beta-alkoxy propionaldehyde and an amino acid amide of para-aminobenzoic acid at a temperature within the range of 20° C. to 80° C. whereby compounds having the general formula

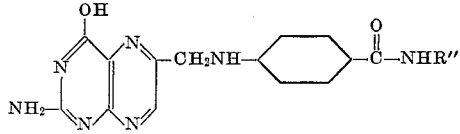

in which NHR'' is an amino acid radical, are produced and recovered.

9. A method which comprises reacting together in a solvent 2,4,5-triamino-6-hydroxy pyrimidine, an alpha-halo-beta-alkoxy propionaldehyde and an amino acid amide of aminobenzoic acid at a temperature within the range of 20° C. to 80° C. whereby compounds having the general formula,

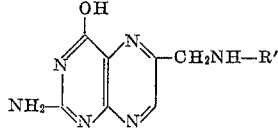

in which R' is an amino acid amide of benzoic acid, are produced and recovered.

JOHN GERACI.

No references cited.